Aug. 8, 1950     W. VOGEL     2,517,743
SUPPLY RESERVOIR FOR HEAVY LIQUIDS
Filed July 23, 1947
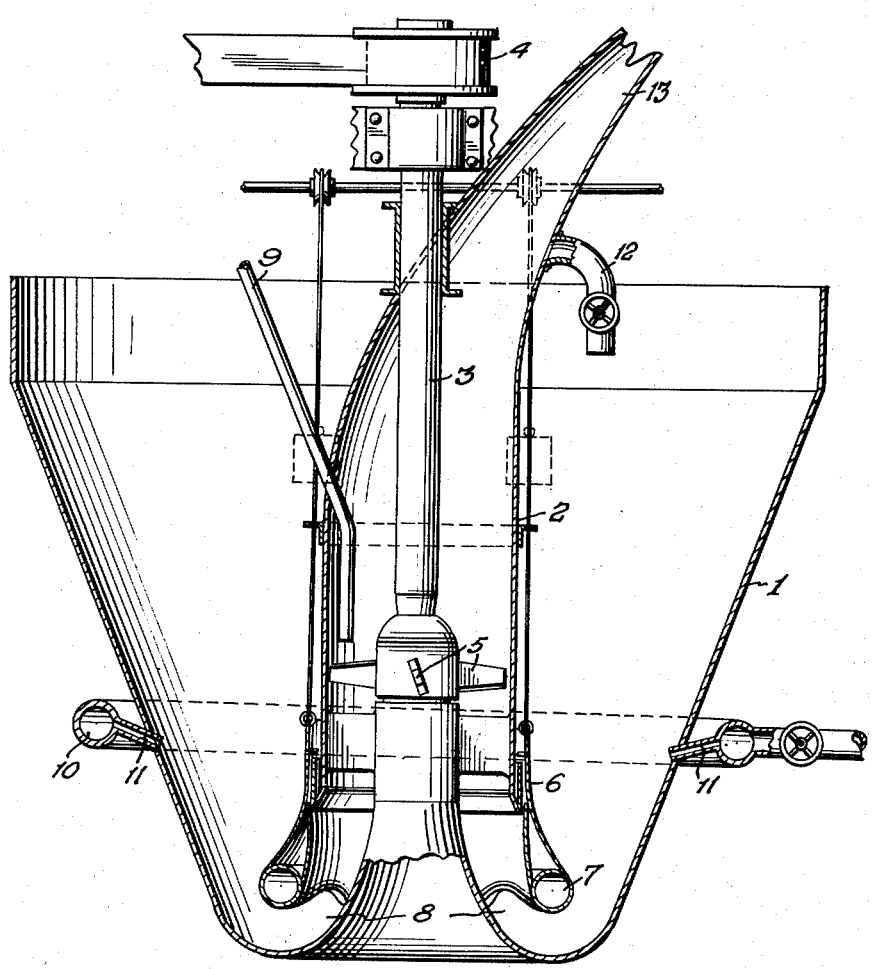
Inventor,
Walter Vogel Patented Aug. 8, 1950

2,517,743

UNITED STATES PATENT OFFICE 2,517,743

SUPPLY RESERVOIR FOR HEAVY LIQUIDS

Walter Vogel, Santiago, Chile

Application July 23, 1947, Serial No. 763,119
In Switzerland September 11, 1946

12 Claims. (Cl. 259—96)

This invention concerns a supply reservoir, specially devised to receive the liquid discharged from the separating apparatus in separating plants using unstable heavy liquids.

Heretofore such installations required in addition to the supply reservoir, an agitator tank in which—when the plant is not in operation—all the liquid discharged from the separating apparatus is stored. In this tank the liquid decants. When the plant is again placed in operation this liquid is fed to the supply reservoir for recirculation by means of pumps after having been thoroughly agitated and the density thereof tested and corrected.

By means of this invention it is possible to greatly simplify the installations by equipping the supply reservoir with means of agitating the liquid prior to recirculation thereof to the separating apparatus.

The accompanying drawing shows a vertical cross section of one form of execution of the supply reservoir covered by this invention.

The liquid discharged from the separating apparatus (not shown in the drawing) is introduced into the supply reservoir 1 which tapers toward its bottom. Coaxial with reservoir 1 there is a tube 2, the upper end of which curves to one side and projects from the supply reservoir 1 as a discharge pipe 13. This pipe 13 is connected to a conduit (not shown) whereby the liquid is recirculated to the separating apparatus. The reservoir 1 has a pillar 1a projecting upwardly from the center of the bottom of the reservoir 1 and into the lower end of the tube 2.

Coaxial with tube 2 and pillar 1a there is a shaft 3 having its lower end journalled in the upper end of the pillar 1a and its upper end carrying a pulley 4 for driving an impeller type pump at the lower end of the shaft 3, which pump may also be used as the principal recirculating pump in the heavy liquid plant. This pump is used not only to recirculate the liquid during the operation, but also to agitate the same. The pump's impeller blades 5 are so disposed that at all times they are above the upper plane of the layer of solids settled to the bottom of the supply reservoir 1 upon decantation of the liquid. Slidably mounted on the lower end of tube 2 there is a cylindrical sleeve 6 which may be vertically adjusted so as to control the velocity of the flow of liquid entering tube 2 between pillar 1a and sleeve 6 so as to remove any solids that settle to the bottom of the supply reservoir. The lower end of the adjustable sleeve is provided with a peripheral protuberance 7 which has a corrugated lower edge providing openings 8 which permit passage of the liquid. This protuberance 7 has the form of a hollow sealed chamber which may also be used as a float and may be counterweighted in such manner that at a given density of the liquid in the reservoir 1 the protuberance 7 and sleeve 6 will float and thereby automatically avoid any obstruction when the machine is stopped.

Before operating the agitator it is expedient, in order to expose the impeller blades 5, to inject air above the liquid in the supply reservoir by means of tube 9 and tubes 11 branching from the circular tube 10.

While the liquid is being agitated with the solids that have settled to the bottom of supply reservoir 1 the adjustable sleeve 6 supported over the layer thereof, automatically descends and the liquid passes through openings 8 into tube 2 and is impelled by the action of the pump's impeller blades 5. During agitation the branched tube 12 is open, so that the liquid returns to supply reservoir 1 in a short circuit. As soon as the liquid has been sufficiently agitated with the solids, branched tube 12 is closed and the liquid is circulated from tube 2 through tube 13 to the separating apparatus.

In addition to its application in plants using heavy liquids, the supply reservoir covered by this invention may also be used in connection with stored liquids that tend to decant and are to be reused in any processing apparatus.

This and other advantages are particularly noteworthy in separating installations using heavy liquids, wherein the partial streams of heavy liquids discharged from the separating apparatus are passed over screens and magnetic separators, and conducted to storage reservoirs in the shape of cones. When operation of one of these plants is stopped, the heavy liquid must be conducted from the supply reservoir to an agitator tank, and when the plant is again placed in operation, the liquid must be recirculated to the supply reservoir and to the separating apparatus. Such operation requires several pumps and important differences in elevation must be overcome. With the apparatus embodying this invention it has been possible to avoid all these complications and disadvantages.

I claim:

1. In a liquid reservoir, the combination of a pillar projecting upwardly from the center of the bottom of said reservoir; a tube projecting downwardly into said reservoir and having its lower end about said pillar; means for inducing a flow of liquid upwardly through said tube; a peripheral sleeve slidably mounted on said lower end of said tube for vertical movement relative to said bottom of said reservoir, said sleeve having a peripheral, hollow sealed chamber on its lower end and a counterpoise for said sleeve so that a given density of liquid in the reservoir will float said sleeve.

2. A reservoir according to claim 1, in which said chamber has a corrugated lower periphery to provide a plurality of liquid passages between said sleeve and said bottom.

3. A supply reservoir for liquids having a tendency to separate on standing comprising a body for receiving the liquid, a circulating and delivery tube vertically disposed within the body and terminating in spaced relation to the bottom thereof, a circulating and delivering impeller pump concentrically disposed within the tube above the level of a layer of solids settling from the liquid when the same is left standing in the reservoir, said tube having a valve controlled branch portion directed toward the bottom of the reservoir, the main portion of said tube delivering liquid exteriorly of the reservoir, a sleeve constituting a baffle slidably mounted on said tube at the lower end thereof so as to control the opening between its lower edge and the layer of solids resting in the bottom of the reservoir, a float chamber incorporated with said sleeve, and a counterweight for said sleeve so that the sleeve will float at a given density of the liquid, means for introducing air into the tube and separate means for introducing air into the reservoir so as to agitate the solids so as to avoid fouling of the impeller so that upon operation of the pump the same will circulate liquid through the tubes.

4. A supply reservoir for liquids as defined in claim 3 in which the lower peripheral portion of said sleeve is corrugated to provide openings for the passage of the liquid.

5. A supply reservoir for liquids including a vertically disposed tube terminating in spaced relation to the bottom thereof, an impeller type circulating pump disposed co-axially within said tube, a sleeve baffle concentrically disposed about that tube and slidably mounted thereon, and a float chamber incorporated with said sleeve baffle so that the same will automatically rise in accordance with the density of the liquid within the reservoir.

6. A supply reservoir for liquids as defined in claim 5 in which a conduit extends within said tube for injecting air therein, and in which additional air injecting means extend within the reservoir for injecting air therein, both said injecting means agitating any solids lying on the bottom of the reservoir.

7. In combination a tank, a circulating tube vertically disposed within the tank and terminating in spaced relation to the bottom thereof, a liquid flow inducing means disposed within said tube, a sleeve slidably mounted on the lower end of said tube, and floatable means and a counterweight connected to said sleeve for moving the same in accordance with the density of the liquid in the tank.

8. A supply reservoir for liquids that tend to separate on standing, particularly heavy liquids from sink and float processes, comprising a downwardly tapered tank, a vertical tube in front of the deepest point of the tank for delivering liquid exteriorly thereof, an impeller type pump co-axially disposed within the tube, a lower bearing for said pump, the bottom of the tank having a cylindrical protuberance extending upwardly therefrom coaxially with said tube, said protuberance mounting said pump bearing to dispose the pump above the level of the layer of solids that settles in the tank when the liquid is left standing, a slidably adjustable baffle concentrically surrounding said protuberance, and the lower end of the tube, said baffle being adjustable along said tube so as to control the opening between the lower edge of the baffle and the layer of solids that forms in the lower part of the tank.

9. A supply reservoir for liquids that tend to separate on standing, particularly heavy liquids from sink and float processes, comprising a downwardly tapered tank, a vertical tube in front of the deepest point of the tank for delivering liquid exteriorly thereof, an impeller type pump co-axially disposed within the tube, a lower bearing for said pump, the bottom of the tank having a cylindrical protuberance extending upwardly therefrom coaxially with said tube, said protuberance mounting said pump bearing to dispose the pump above the level of the layer of solids that settles in the tank when the liquid is left standing, a slidable adjustable baffle concentrically surrounding said protuberance, and the lower end of the tube, said baffle being adjustable along said tube so as to control the opening between the lower edge of the baffle and the layer of solids that forms in the lower part of the tank, the lower part of said baffle comprising an annular enlargement with its bottom surface transversely corrugated to provide openings for the passage of the liquid.

10. A supply reservoir for liquids that tend to separate on standing, particularly heavy liquids from sink and float processes, comprising a downwardly tapered tank, a vertical tube in front of the deepest point of the tank for delivering liquid exteriorly thereof, an impeller type pump co-axially disposed within the tube, a lower bearing for said pump, the bottom of the tank having a cylindrical protuberance extending upwardly therefrom coaxially with said tube, said protuberance mounting said pump bearing to dispose the pump above the level of the layer of solids that settles in the tank when the liquid is left standing, a slidably adjustable baffle concentrically surrounding said protuberance and the lower end of the tube, said baffle being adjustable along said tube so as to control the opening between the lower edge of the baffle and the layer of solids that forms in the lower part of the tank, the lower part of said baffle comprising a hollow annular enlargement defining a float, and means counterweighting the same so that it will float at a given density of the heavy liquid.

11. A supply reservoir for liquids that tend to separate on standing, particularly heavy liquids from sink and float processes, comprising a downwardly tapered tank, a vertical tube in front of the deepest point of the tank for delivering liquid exteriorly thereof, an impeller type pump co-axially disposed within the tube, a lower bearing for said pump, the bottom of the tank having a cylindrical protuberance extending upwardly therefrom coaxially with said tube, said protuberance mounting said pump bearing to dispose the pump above the level of the layer of solids that settles in the tank when the liquid is left standing, a slidably adjustable baffle concentrically surrounding said protuberance and the lower end of the tube, said baffle being adjustable along said tube so as to control the opening between the lower edges of the baffle and the layer of solids that forms in the lower part of the tank, the lower part of said baffle comprising a hollow annular enlargement defining a float, and means counterweighting the same so that it will float at a given density of the heavy liquid, the said vertical tube being curved to one side and having a branch to return liquid to the tank, a pump rod for the pump passing through the tube, and a drive pulley therefor disposed exteriorly of the tank.

12. A supply reservoir for liquids that tend to separate on standing, particularly heavy liquids from sink and float processes, comprising a downwardly tapered tank, a vertical tube in front of the deepest point of the tank for delivering liquid exteriorly thereof, an impeller type pump coaxially disposed within the tube, a lower bearing for said pump, the bottom of the tank having a cylindrical protuberance extending upwardly therefrom coaxially with said tube, said protuberance mounting said pump bearing to dispose the pump above the level of the layer of solids that settles in the tank when the liquid is left standing, a slidably adjustable baffle concentrically surrounding said protuberance and the lower end of the tube, said baffle being adjustable along said tube so as to control the opening between the lower edge of the baffle and the layer of solids that forms in the lower part of the tank, the lower part of said baffle comprising a hollow annular enlargement defining a float, means counter-weighting the same so that it will float at a given density of the heavy liquid, the said vertical tube being curved to one side and having a branch to return liquid to the tank, a pump rod for the pump passing through the tube, a drive pulley therefor disposed exteriorly of the tank, and means to inject air into the tank and the said vertical tube surrounding the pump to commence agitation.

WALTER VOGEL.

REFERENCES CITED

The following references are of record in the file of this patent:

UNITED STATES PATENTS

| Number | Name | Date |
| --- | --- | --- |
| 1,805,842 | Peck | May 19, 1931 |
| 1,891,122 | Urch | Dec. 13, 1932 |
| 1,933,346 | Schwentker | Oct. 31, 1933 |
| 2,096,728 | Bighouse | Oct. 26, 1937 |
| 2,367,149 | Smith | Jan. 9, 1945 |